(12) United States Patent
Lumpkin

(10) Patent No.: US 10,363,824 B1
(45) Date of Patent: Jul. 30, 2019

(54) VEHICLE JUMPSTARTING SYSTEM

(71) Applicant: Kourtney Lumpkin, Lakeland, FL (US)

(72) Inventor: Kourtney Lumpkin, Lakeland, FL (US)

( * ) Notice: Subject to any disclaimer, the term of this patent is extended or adjusted under 35 U.S.C. 154(b) by 139 days.

(21) Appl. No.: 15/444,484

(22) Filed: Feb. 28, 2017

(51) Int. Cl.
*H02J 7/00* (2006.01)
*B60L 11/18* (2006.01)

(52) U.S. Cl.
CPC ......... *B60L 11/1816* (2013.01); *H02J 7/0042* (2013.01); *H02J 7/0054* (2013.01)

(58) Field of Classification Search
CPC ........................... H02J 7/0054; B60L 11/1809
USPC .................. 320/103, 104, 105, 109
See application file for complete search history.

(56) References Cited

U.S. PATENT DOCUMENTS

| | | | |
|---|---|---|---|
| 4,157,492 A | 6/1979 | Colbrese | |
| 4,662,696 A | 5/1987 | Asbury | |
| 5,921,809 A * | 7/1999 | Fink | H01M 2/305 439/504 |
| 6,765,306 B2 | 7/2004 | Fattic | |
| 2005/0070155 A1* | 3/2005 | Horenstein | H01R 11/288 439/522 |
| 2012/0303397 A1* | 11/2012 | Prosser | H02J 7/0054 705/7.12 |
| 2015/0180144 A1 | 6/2015 | Martens | |
| 2018/0229613 A1* | 8/2018 | Rajaie | B60L 11/1809 |

FOREIGN PATENT DOCUMENTS

WO 2014023624 A1 2/2014

* cited by examiner

*Primary Examiner* — Edward Tso
*Assistant Examiner* — Aaron Piggush

(57) ABSTRACT

The vehicle jumpstarting system is a safe and convenient alternative to the use of traditional jumper cables. The system provides a multiplicity of battery ports providing electrical access to the vehicle battery at the front, rear, and both sides of a vehicle, a cabling harness tying the ports to each other and to the vehicle battery, fuse protection from high currents, and a detachable cable that connects between a battery port on a first vehicle and a battery port on a second vehicle.

9 Claims, 6 Drawing Sheets

VEHICLE JUMPSTARTING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of automotive electrical systems, more specifically, the practice of jumpstarting (or boosting) a vehicle with a discharged battery by using a temporary connection to the charged battery of a second vehicle.

As the owners of automobiles and other vehicles are all too aware, modern vehicles require at least a partially charged battery in order to activate the vehicle starter motor and start the main engine. The process of running the starter motor is often referred to as cranking. The demand placed upon a typical automobile battery during the cranking process can be quite high—400 to 500 amperes of current draw for several seconds is not uncommon. In cases where a battery has been substantially discharged because headlights were left on, the ignition switch was left in the accessories position, the vehicle battery is weak due to old age and/or poor maintenance, or weather has turned exceptionally cold, the vehicle battery may not be able to provide sufficient current to crank the engine.

A common practice during dead battery situations is to seek a "jump" (sometimes called a "boost") from another vehicle. To do this, a jumper cable (aka booster cable) must be available and the vehicle with the good battery (the donor vehicle) must be positioned close enough to the vehicle with the discharged battery (the recipient vehicle) such that a direct connection between the batteries of the two vehicles can be made using the jumper cable. Typical jumper cables are 6 to 15 ft in length. They consist of two thick conductors with an insulating cover around each conductor. The thick conductors are necessary to handle the high current involved. The insulation around each of the conductors is typically fused together to form a single cable for most of the length of the jumper cables. At each end the two conductors separate for approximately a foot in length and each conductor ends with a large "alligator-clip" connector attached to the metal conductor where the insulation has been stripped away from the conductors. The cable and/or alligator clips are often color coded red for positive and black for negative and the placement of the alligator clips onto the terminals of each battery must conform with the polarity of the terminals. The jumper cables must be connected between the vehicle battery terminals according to directions provided with the vehicles or with the jumper cables while the donor vehicle engine is running. Extreme care must be taken to avoid the dangling alligator clips on either end of the cable from touching each other or from touching the vehicle frame (which is often electrically grounded to the negative side of the battery.) Because automotive batteries are designed to supply very high current levels, an unintentional short circuit due to touching jumper cables in the wrong place can literally weld parts together and cause fires. Even the dead battery in the recipient vehicle may hold enough of a charge to cause damage despite its inability to crank the engine.

Use of traditional jumper cables can be very inconvenient and extremely dangerous. The donor vehicle must be positioned near the recipient vehicle, preferably in a way that places the engine compartments (and specifically, the batteries) of each vehicle close together. If the parking spaces on both sides of the recipient vehicle are taken, it may be necessary to move the recipient vehicle manually (for example, by pushing) to gain access to the battery. Even if a parking space is available next to the recipient vehicle, there is no standard placement within the engine compartment for batteries so it may be the case that the jumper cable cannot reach from one side of one vehicle's engine compartment to the opposing side of an adjacent vehicle's engine compartment. Placing the vehicles side-by-side and close enough to allow the jumper cables to connect to the batteries may result in one driver's door or the other becoming inaccessible, which is problematic because a driver must be in the recipient vehicle to attempt to start the engine once the jumper cables are in place.

Furthermore, batteries are polarized and it is critical to connect one battery's positive terminal to the other battery's positive and likewise negative terminal to negative terminal. Although the cable and/or alligator clips may be color-coded the polarity markings on the battery may be small or obscured introducing a risk that the connection will be made improperly. The alligator clips must achieve a solid electrical connection to the terminals on each battery and the terminals may be contaminated with buildup that prevents this. Because the contaminants on and around battery terminals may contain sulfuric acid eye protection should be worn. If any of the acidic contaminant gets on clothing the clothing may be ruined and sulfuric acid on skin can cause burns. Batteries that are charging can produce flammable hydrogen gas (and the act of connecting or disconnecting an alligator clip to a battery terminal can create sparks) so it is not unheard of that an attempt to jump start a vehicle results in an explosion of the battery or a fire in the engine compartment.

SUMMARY OF INVENTION

The vehicle jumpstarting system presented in this disclosure is a safe and convenient alternative to the use of traditional jumper cables. The system provides a multiplicity of battery ports providing electrical access to the battery at the front, rear, and both sides of a vehicle, a cabling harness tying the ports to each other and to the vehicle battery, fuse protection from high currents, and a detachable cable that connects between a battery port on the donor vehicle and a battery port on the recipient vehicle.

An object of the invention is to provide more convenient access to battery connections when jump starting a vehicle.

An additional object of the invention is to provide safer access to battery connections when jump starting a vehicle.

This together with additional objects, features and advantages of the vehicle jumpstarting system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle jumpstarting system in detail, it is to be understood that the vehicle jumpstarting system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle jumpstarting system.

It is therefore important that the claims be regarded as including such equivalent construction insofar as they do not depart from the spirit and scope of the vehicle jumpstarting system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
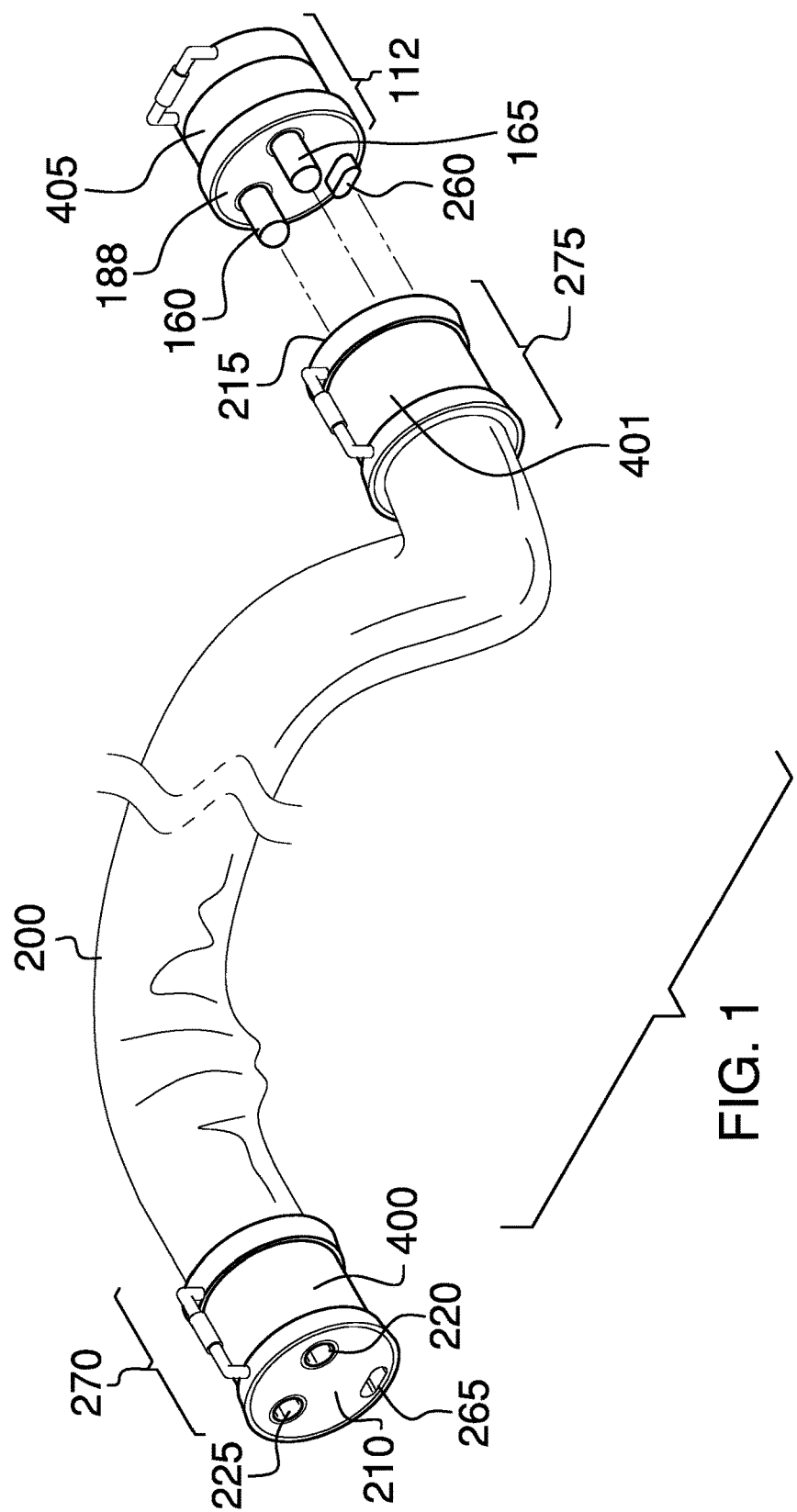
FIG. 1 is a perspective view of an embodiment of the disclosure.
Figure 2:
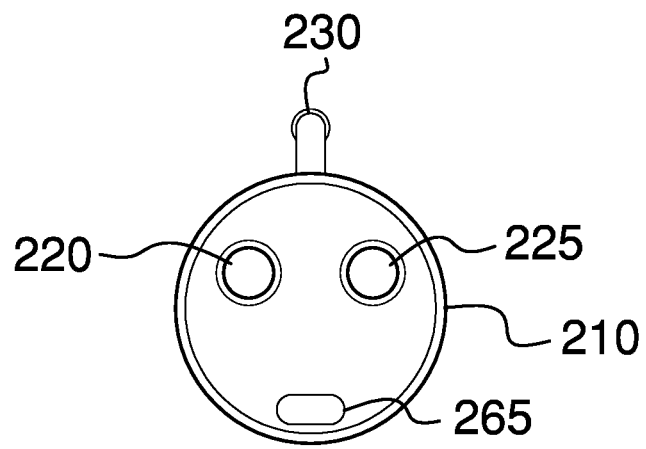
FIG. 2 is an end view of a component associated with an embodiment of the disclosure.
Figure 3:
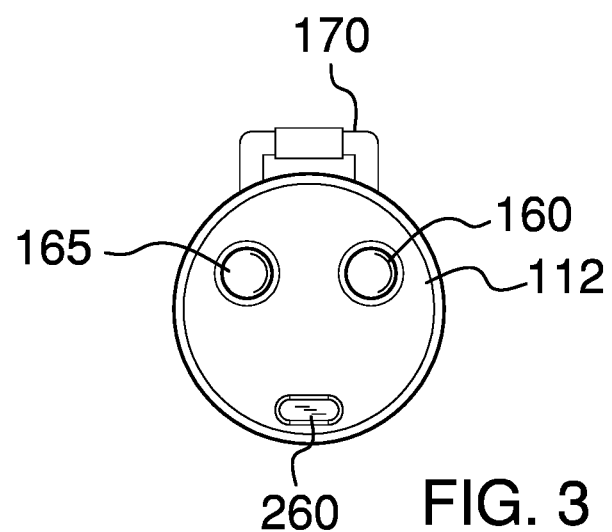
FIG. 3 is an end view of another component of an embodiment of the disclosure.
Figure 4:
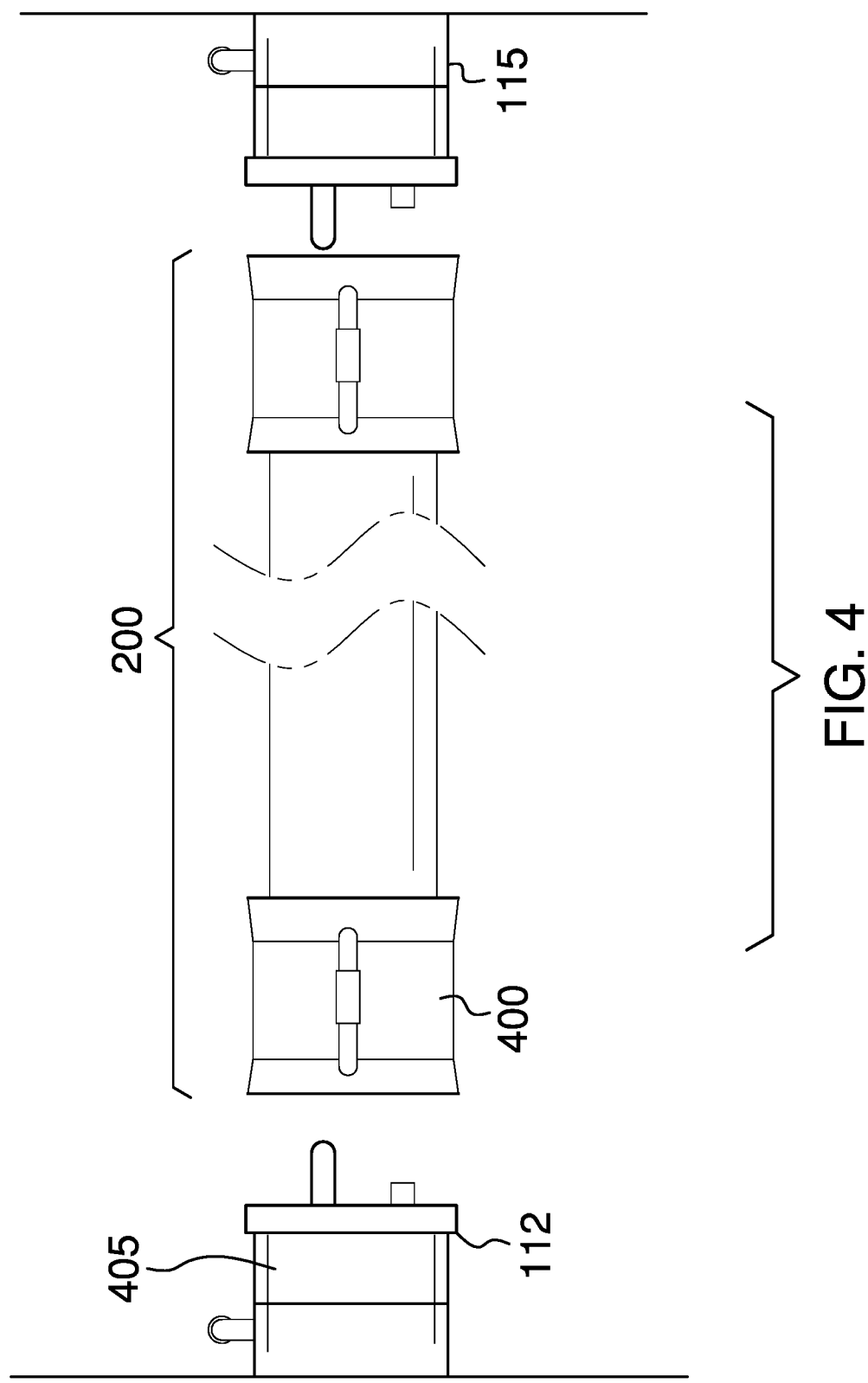
FIG. 4 is a side view of an embodiment of the invention.
Figure 5:
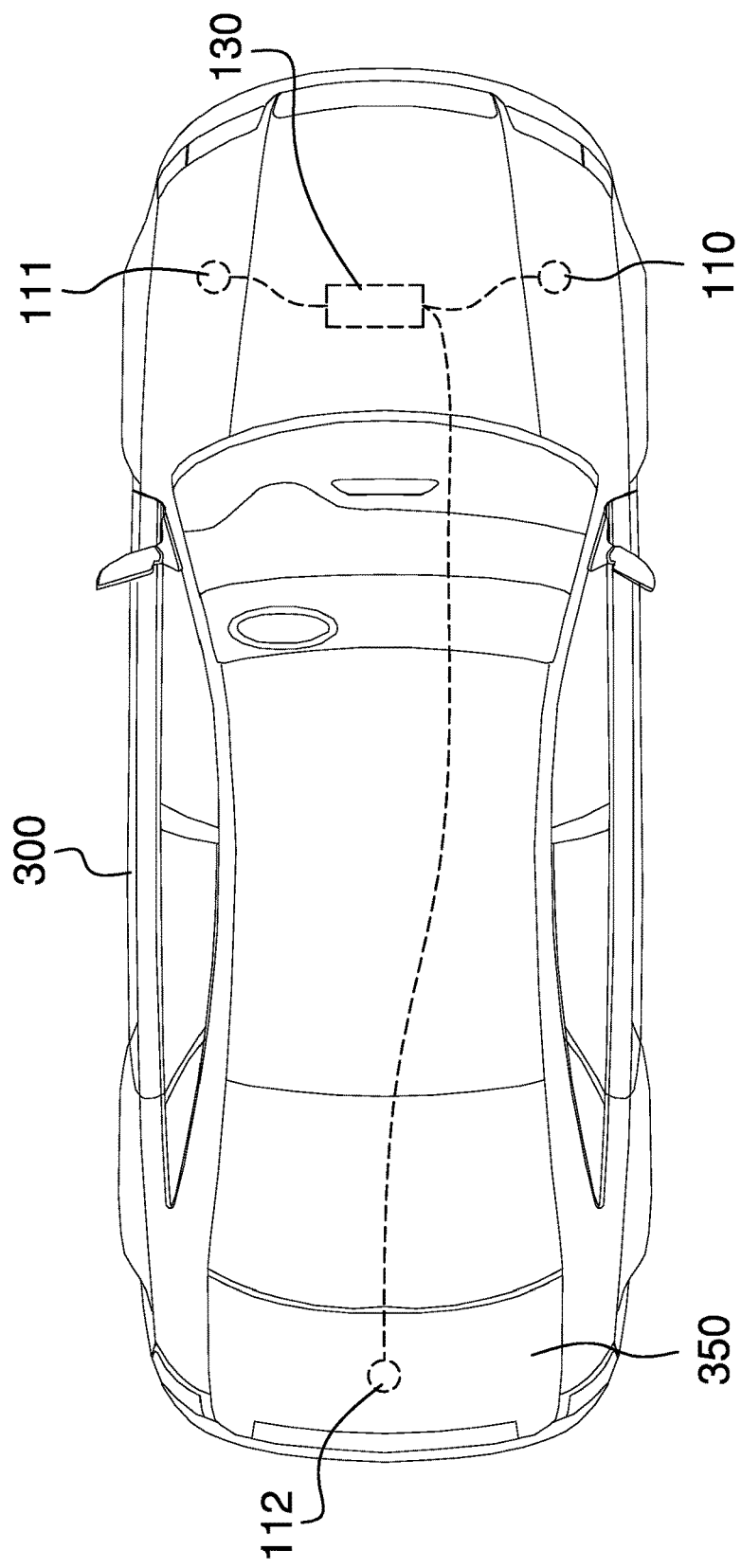
FIG. 5 is a top view of a vehicle illustrating applicable componentry of an embodiment of the disclosure.
Figure 6:
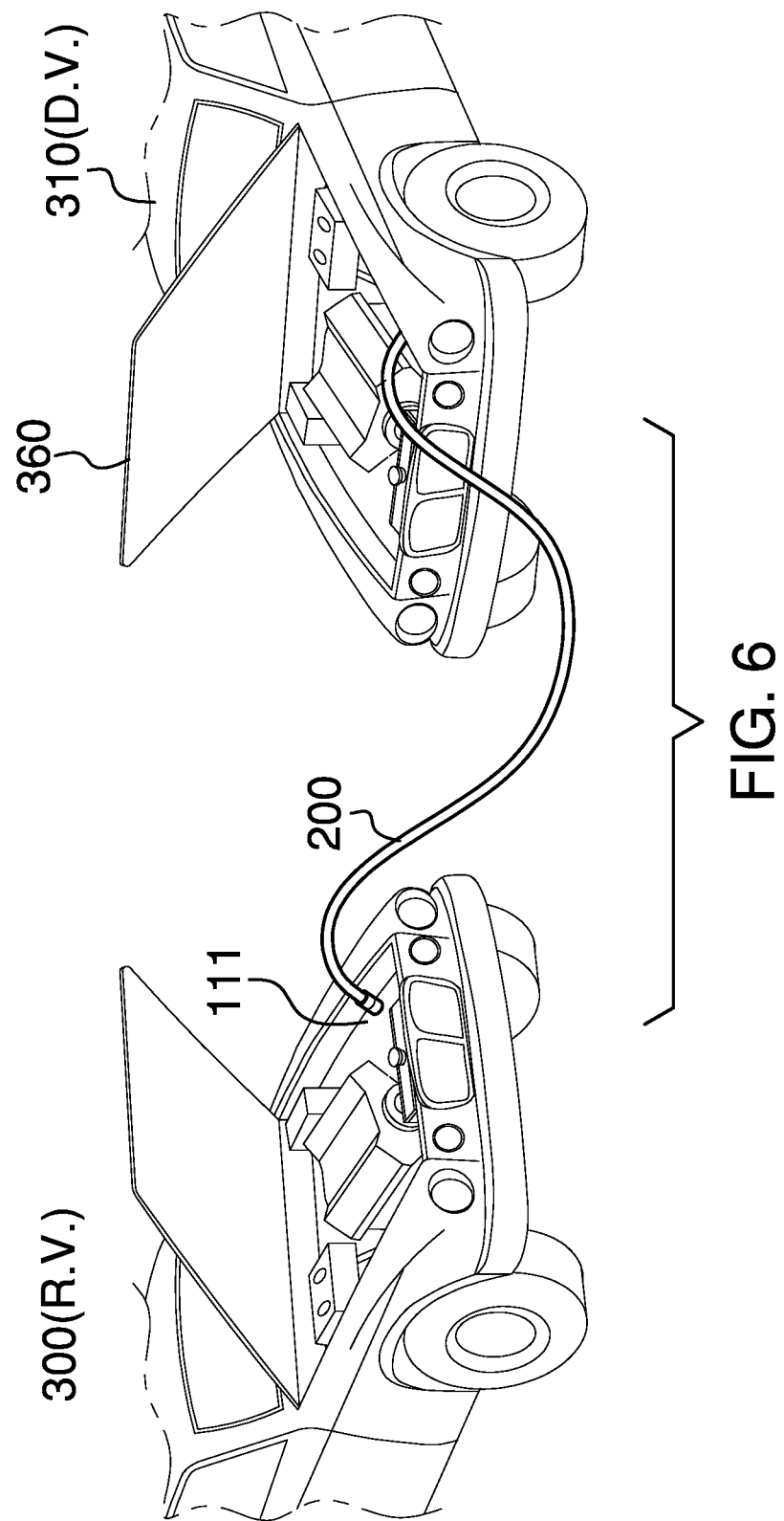
FIG. 6 is a perspective view of an embodiment of the disclosure in use.
Figure 7:
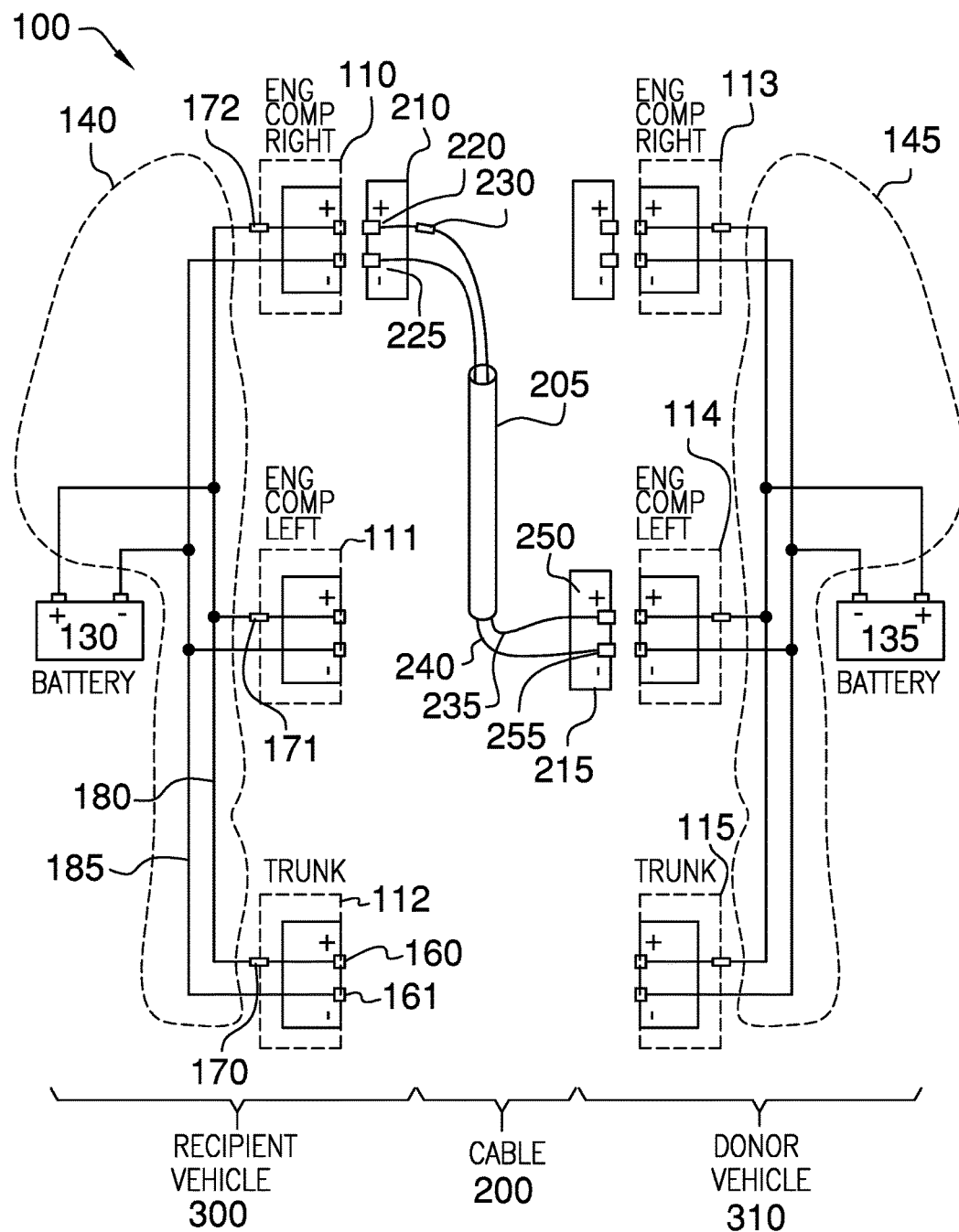
FIG. 7 is a schematic diagram of componentry of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. As used herein, the word "or" is intended to be inclusive. As used herein, the term "fuse" refers to an electrical or electromechanical component intended to break a circuit in the presence of excess current flow, including components that are removable, replaceable, or resettable. As used herein, the term "recipient vehicle" refers to a vehicle with a discharged or faulty battery and which requires a jump start from another vehicle. As used herein, the term "donor vehicle" refers to a vehicle with a charged, functional battery, which is being used to provide current to another vehicle during a jump start operation. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7. The vehicle jumpstarting system (hereinafter invention) 100 comprises an engine compartment right battery port 110, an engine compartment left battery port 111, a trunk battery port 112, and a cable harness 140. The cable harness 140 is able to tie the various battery ports to each other and to an applicable vehicle battery 130. The invention 100 also includes an engine compartment right battery port fuse 172, an engine compartment left battery port fuse 171, a trunk battery port fuse 170, and a cable 200 for connection between vehicles.

Each of the battery ports (represented for purposes of this discussion by 112) comprise a battery port positive contact 160 and a battery port negative contact 165 configured at a spacing and dimensions to match their mating contacts on the cable 200.

The cable 200 includes an outer cable cover 205, which is able to insulate and protect a positive conductor 235, a negative conductor 240. The cable 200 is further defined with a first cable connector 210, a second cable connector 215, a first collar 270, second collar 275, and a cable fuse 230. The positive conductor 235 and the negative conductor 240 are each electrically insulated from each other. The positive conductor 235 connects to the first cable connector positive contact 220, and the first cable connector positive contact 220 is affixed to the first cable connector 210. The positive conductor 235 is also connected to the second cable connector positive contact 250. The second cable connector positive contact 250 is affixed to the second cable connector 215. The negative conductor 240 connects to the first cable connector negative contact 225. The first cable connector negative contact 225 is affixed to the first cable connector 210. The negative conductor 240 is also connected to the second cable connector negative contact 255. The second cable connector negative contact 255 is also affixed to the second cable connector 215. One of the cable conductors (for example, the positive conductor 235) is routed through a cable fuse 230 to provide over-current protection. Where the positive conductor 235 or the negative conductor 240 connects to a contact or a fuse, the conductor is first stripped of insulation to assure a solid electrical connection.

To simplify the drawings, some of the reference characters in FIG. 1 are numbered only for a recipient vehicle 300, however the same elements exist within a donor vehicle 310. The first collar 270 serves to join the outer cable cover 205 with the first cable connector 210 and offers rigidity at that end of the cable 200 during plugging and unplugging operations. The second collar 275 serves to join the outer cable cover 205 with the second cable connector 215 and offers rigidity at that end of the cable 200 during plugging and unplugging operations.

The multiplicity of battery ports enables convenient access from either side or a rear of the recipient vehicle 300 or donor vehicle 310. For example, if a parking space is open on the left side of the recipient vehicle 300, then the engine compartment of the recipient vehicle 300 at the left battery port 111 may be used. If a parking space is open on the right side of the recipient vehicle 300, then the engine compartment of the recipient vehicle 300 at the right battery port 110 may be used. If no spaces are open on the either side of the recipient vehicle 300, then a trunk 350 may be opened and a jumper connection can be made using the trunk battery port 112 of the recipient vehicle 300. It goes without saying that both the recipient vehicle 300 and the donor vehicle 310 each include the trunk battery port 112, the engine compartment right battery port 110, and the engine compartment left battery port 111.

The battery ports (110-112) make the process of jump-starting the recipient vehicle 300 much safer. Because the jumper cables must no longer attach directly to battery terminals, the risk of explosion or fire due to battery fumes is greatly reduced. The user is no longer exposed to acidic residue from the battery terminals. There is no longer a risk of having dangling alligator clips shorting against each other of against the vehicle frame. Because it is not necessary to make individual positive terminal and negative terminal connections, there is no chance of reversing the polarity of the connection.

In a preferred embodiment, the cable 200 is between 5 and 20 feet long and is constructed using the flexible outer cable cover 205, the first collar 270, the second collar 275, the first cable connector 210, the first cable connector positive contact 220, the first cable connector negative contact 225, the second cable connector 215, the second cable connector positive contact 250, the second cable connector negative contact 255, the cable fuse 230, the insulated positive conductor 240, and the insulated negative conductor 240. The positive conductor 235 and negative conductor 240 may be manufactured using a polyethylene insulation over a copper wire, however those skilled in the art will appreciate that the use of other materials or other lengths in making the cable 200 is possible without departing from the spirit and scope of the invention 100. The insulated positive conductor 235 and insulated negative conductor 240 must use sufficiently thick conductors to carry the high current levels associated with cranking a vehicle engine.

The cable 200 includes the cable fuse 230 at one end of one conductor (typically the positive conductor 235). This is to protect from high levels of current if the contacts 220 and 225 at one end of the cable 200 or contacts 250 and 255 at the other end of the cable 200 should touch a metal object and create a short circuit across the battery electrically attached to the cable.

In some embodiments, the cable 200 may provide a grasping handle on each end of the cable 200 to aid with plugging and unplugging the cable. The first cable collar 270 and the second cable collar 275 may be used as handles to aid in plugging or unplugging the cable 200.

In some embodiments, each cable connector (represented for the purposes of this discussion by 210) and each battery port (represented by 112) may have one or more alignment features to prevent mis-plugging. As a non-limiting example, the battery ports (represented by 112) may have an alignment feature 260 comprising a protrusion of a specific shape outward from a first surface 188 of the connector. The cable connectors (represented by 210) may have an alignment feature 265 comprising an indentation of the same specific shape inward from a second surface 189 of the connector and sized so that the protrusion of the battery port 112 alignment feature 260 just fits inside of the indentation of the cable connector 210 alignment feature 265.

Although the preferred embodiment has illustrated battery port positive contacts (represented by 160) and battery port negative contacts (represented by 165) as male pins and has illustrated cable connector positive contacts (represented by 260) and cable connector negative contacts (represented by 265) as female sockets, those skilled in the art will appreciate that it is possible to swap the gender of both sides of the connection (for example, using male pins on the cable and female sockets on the battery ports) or to swap the gender of ½ half of the contacts (for example, having one male pin and one female socket on the cable connectors and one female socket and one male pin on the battery port, as long as the male pins mate with the female sockets at both contact points) as the specific circumstances of an embodiment may suggest is appropriate.

A first color band 400 may be placed around the first cable collar 270. A second color band 401 may be placed around the second cable collar 275. A color band 405 may also be placed around the battery port connectors (represented by 112) in some embodiments. The color bands may be used to convey information about the vehicle electrical system. As a non-limiting example, color bands may be used to convey a current handling limitation. Matching color bands on the cable 200 and the battery port 112 being used may provide resolute feedback that the cable can handle the amount of current required to start the recipient vehicle 300. In some embodiments, the color bands may comprise more than one color or may include textual or numeric information useful to the user.

The invention 100 provides for a multiplicity of connection points (known as battery ports) throughout the recipient vehicle 300 as well as the donor vehicle 310 to maximize the safety and convenience of a jump starting operation. In a preferred embodiment, a trunk battery port 112 is located inside of the trunk 350, and provides access to jump start the recipient vehicle 300 from the rear of the recipient vehicle 300. The engine compartment right battery port 110 is located under a hood 360, and on the right side of the engine compartment in order to provide access to jump start the recipient vehicle 300 from the right side of the recipient vehicle 300. The engine compartment left battery port 111 is located under the hood 360, and on the left side of the engine compartment in order to provide access to jump start the recipient vehicle 300 from the left side of the recipient vehicle 300. All of the ports 110-112 are bidirectional, which implies that the recipient vehicle 300 may either accept a jump start from the donor vehicle 310 through any one of these ports (110-112).

All three of the battery ports are intended to mate with the cable 200. As previously described, the battery ports may provide alignment or keying features to assure a specific orientation of the cable 200 during the mating processing. Proper orientation is required because the battery connections are polarized.

Each port (represented in this discussion by 110-112) provides a fuse 170 to protect from over current situations. Non-limiting examples of situations where over-current protection may be needed include a fault in the recipient vehicle's electrical system which looks like a dead short to the donor vehicle, a short due to a defect with the cable 200, or a mishandling of the cable 200 that allows the unconnected end of the cable 200 to come in contact with a conductive object and creates a temporary short circuit across the positive and negative contacts at the unconnected end of the cable 200.

In some embodiments steps may be taken to reduce the probability of accidentally creating a short circuit at one of the battery ports. Non-limiting examples of these steps include placing the battery port into a recessed area of the compartment where it is a located, covering the battery port with a door or hatch, providing an auto-disconnect mechanism that electrically disconnects the battery port from the cable harness 140 until the presence of the cable 200 is detected, or combinations of these.

A port color band 405 may be placed around any of the battery ports (represented in this discussion by 110-112). The port color band 405 may be used to convey information about the vehicle electrical system. Uses of the color bands were previously described in the discussion of the DETACHABLE CABLE.

All of the battery ports 110-112 are connected to each other and to the vehicle battery 130 via the cable harness 140. Polarities are observed so that all battery port positive contacts (represented by 160) are connected together and to the positive terminal on the battery 130. Likewise all battery port negative contacts (represented by 165) are connected together and to the negative terminal on the battery 130. The cable harness 140 may be either a one piece harness with multiple ends (one from each battery or battery port) or individual wires run to a centralized distribution block. The cable harness 140 and battery ports 110-112 may be factory installed or they may represent an after-market add-on. The cable harness 140 must use sufficiently thick conductors to carry the high current levels associated with cranking a vehicle engine.

In operation the invention 100 is used by first determining, which side of either the recipient vehicle 300 as well as the donor vehicle 310 will provide best access. Then a determination is made regarding the battery port 110-112 to use on the selected side of both the recipient vehicle 300 and the donor vehicle 310. Next, the donor vehicle 310 is positioned on the side of the recipient vehicle 300 that was selected for access and a battery port 113, 114, or 115 on the recipient vehicle 300. Trunks 350 or hoods 360 on both vehicles (300 and 31) are opened to provide access to the selected battery ports 110-112. The engine of the donor vehicle 310 is started, and the first cable connector 210 of the cable 200 is plugged into the selected battery port 110 on the recipient vehicle 300. The cable 200 is then plugged into the battery port 114 on the donor vehicle 310. With the cable 200 in place, a driver attempts to start recipient vehicle 300.

Once the recipient vehicle 300 has started, the cable 200 is removed via first unplugging the cable 200 from the battery port 114 on the donor vehicle 310, and then unplugging the cable 200 from the battery port 110 on the recipient vehicle 300. Both vehicles (300 and 310) may then be repositioned safely if necessary and the cable 200 may be stowed.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle jumpstarting system comprising:
    a cable with keyed connectors provided at distal ends that are able to connect a donor vehicle to a recipient vehicle in order to jump start a battery of the recipient vehicle;
    wherein the recipient vehicle and the donor vehicle each include an engine compartment right battery port, an engine compartment left battery port, and a trunk battery port;
    wherein the cable is further defined with a cable harness that is able to connect the recipient vehicle to the donor vehicle via the engine compartment right battery port, the engine compartment left battery port, or the trunk battery port;
    wherein the donor vehicle and the recipient vehicle are each further defined as including a vehicle battery;
    wherein the donor vehicle and the recipient vehicle each include an engine compartment right battery port fuse, an engine compartment left battery port fuse, and a trunk battery port fuse;
    wherein the vehicle battery of both the donor vehicle and the recipient vehicle is further defined with a battery port positive contact and a battery port negative contact;
    wherein the cable is further defined to include an outer cable cover, which is able to insulate and protect a positive conductor and a negative conductor;
    wherein the positive conductor and the negative conductor are each electrically insulated from each other;
    wherein the cable is further defined with a first cable connector, a second cable connector, a first collar, second collar, and a cable fuse;
    wherein the positive conductor connects to the first cable connector positive contact, and the first cable connector positive contact is affixed to the first cable connector;
    wherein the positive conductor is also connected to the second cable connector positive contact;
    wherein the second cable connector positive contact is affixed to the second cable connector;
    wherein the negative conductor connects to the first cable connector negative contact;
    wherein the first cable connector negative contact is affixed to the first cable connector;
    wherein the negative conductor is also connected to the second cable connector negative contact;
    wherein the second cable connector negative contact is also affixed to the second cable connector;
    wherein the negative conductor connects to the first cable connector negative contact;
    wherein the first cable connector negative contact is affixed to the first cable connector;
    wherein the negative conductor is also connected to the second cable connector negative contact;
    wherein the second cable connector negative contact is also affixed to the second cable connector;
    wherein a cable fuse is routed through either the positive conductor or the negative conductor to provide overcurrent protection;
    wherein the first collar serves to join the outer cable cover with the first cable connector and offers rigidity at that end of the cable during plugging and unplugging operations;
    wherein the second collar serves to join the outer cable cover with the second cable connector and offers rigidity at that end of the cable during plugging and unplugging operations.

2. The vehicle jumpstarting system according to claim 1 wherein the trunk of the recipient vehicle and the donor vehicle contain the trunk battery port.

3. The vehicle jumpstarting system according to claim 2 wherein a hood of the donor vehicle and the recipient vehicle house the left battery port as well as the right battery port.

4. The vehicle jumpstarting system according to claim 3 wherein the first cable collar and the second cable collar are used as handles to aid in plugging or unplugging the cable.

5. The vehicle jumpstarting system according to claim 4 wherein the left battery port, the right battery port, and the trunk battery port each include a plurality of protrusions of differing shapes, which extend outward from a first surface.

6. The vehicle jumpstarting system according to claim 5 wherein the first cable connector and the second cable connector are each further defined with a plurality of indentations of differing shapes that extend inward from a second surface, and which correspond with the plurality of protrusions.

7. The vehicle jumpstarting system according to claim 4 wherein the first cable connector and the second cable connector each include a plurality of protrusions of differing shapes, which extend outward from a second surface.

8. The vehicle jumpstarting system according to claim 7 wherein the left battery port, the right battery port, and the trunk battery port are each further defined with a plurality of indentations of differing shapes that extend inward from a first surface, and which correspond with the plurality of protrusions.

9. The vehicle jumpstarting system according to claim 4 wherein a first color band is placed around the first cable collar; wherein a second color band is placed around the second cable collar; wherein a third color band is placed around the left battery port, the right battery port, and the trunk battery port; wherein the first color band, the second color band, and the third color band convey information about the a particular electrical system or a current handling limitation.

* * * * *